Aug. 11, 1959 J. S. ROBBINS 2,898,742
ROTARY TUNNELING MACHINE HAVING RATCHETING
ADVANCING AND RETRACTING MEANS
Filed March 8, 1957 4 Sheets-Sheet 3
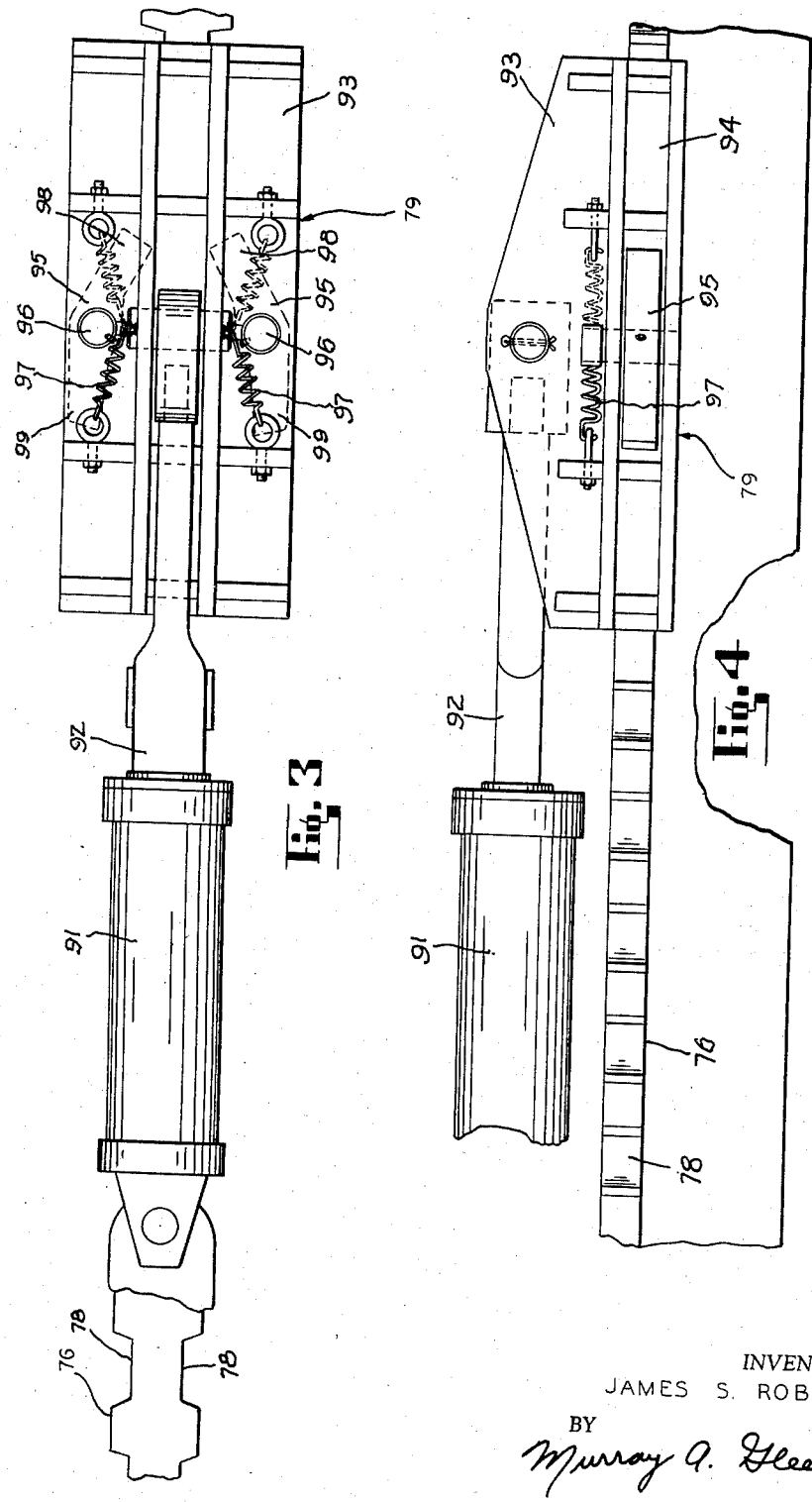
INVENTOR.
JAMES S. ROBBINS
BY
Murray A. Gleeson
ATTORNEY

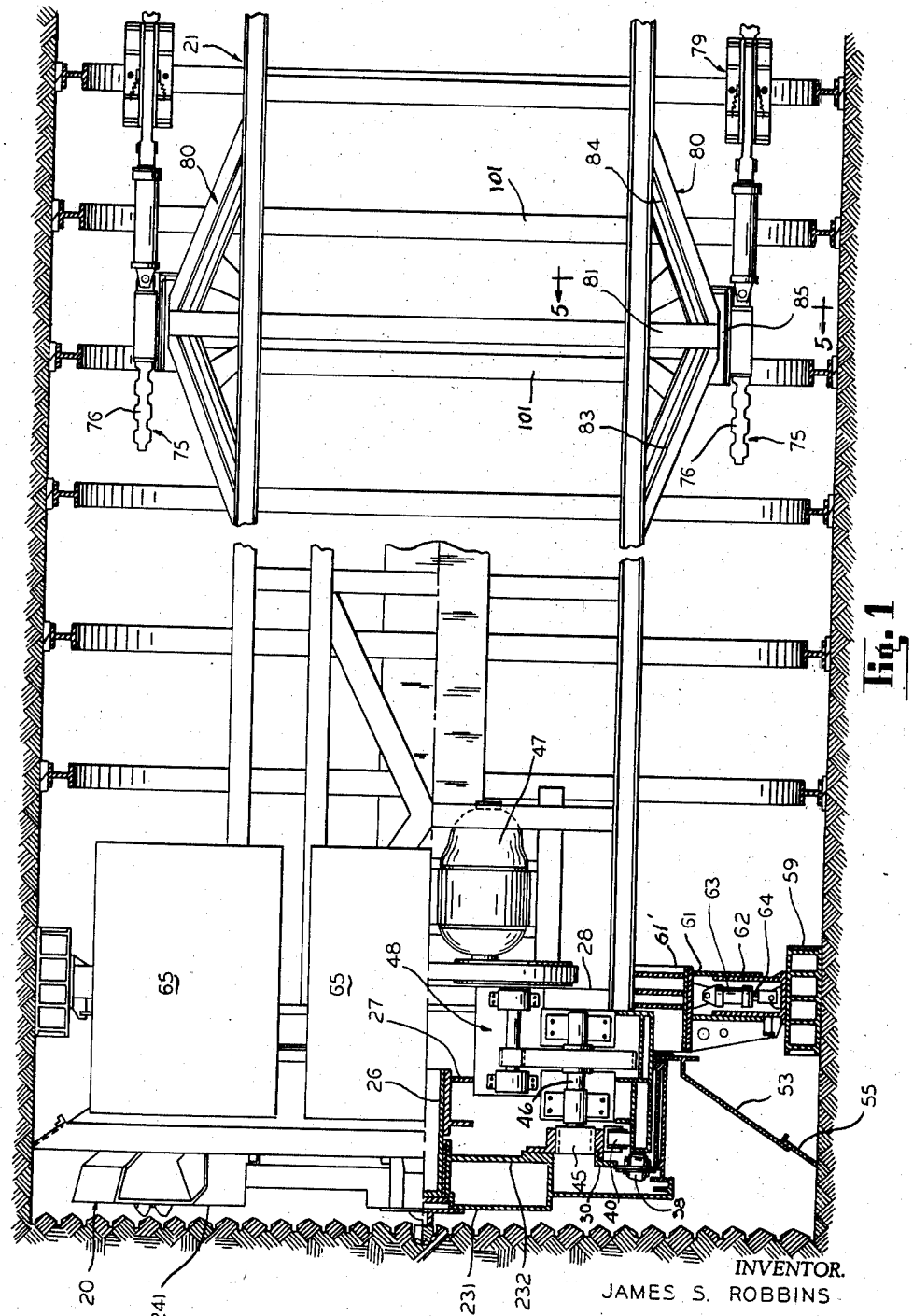

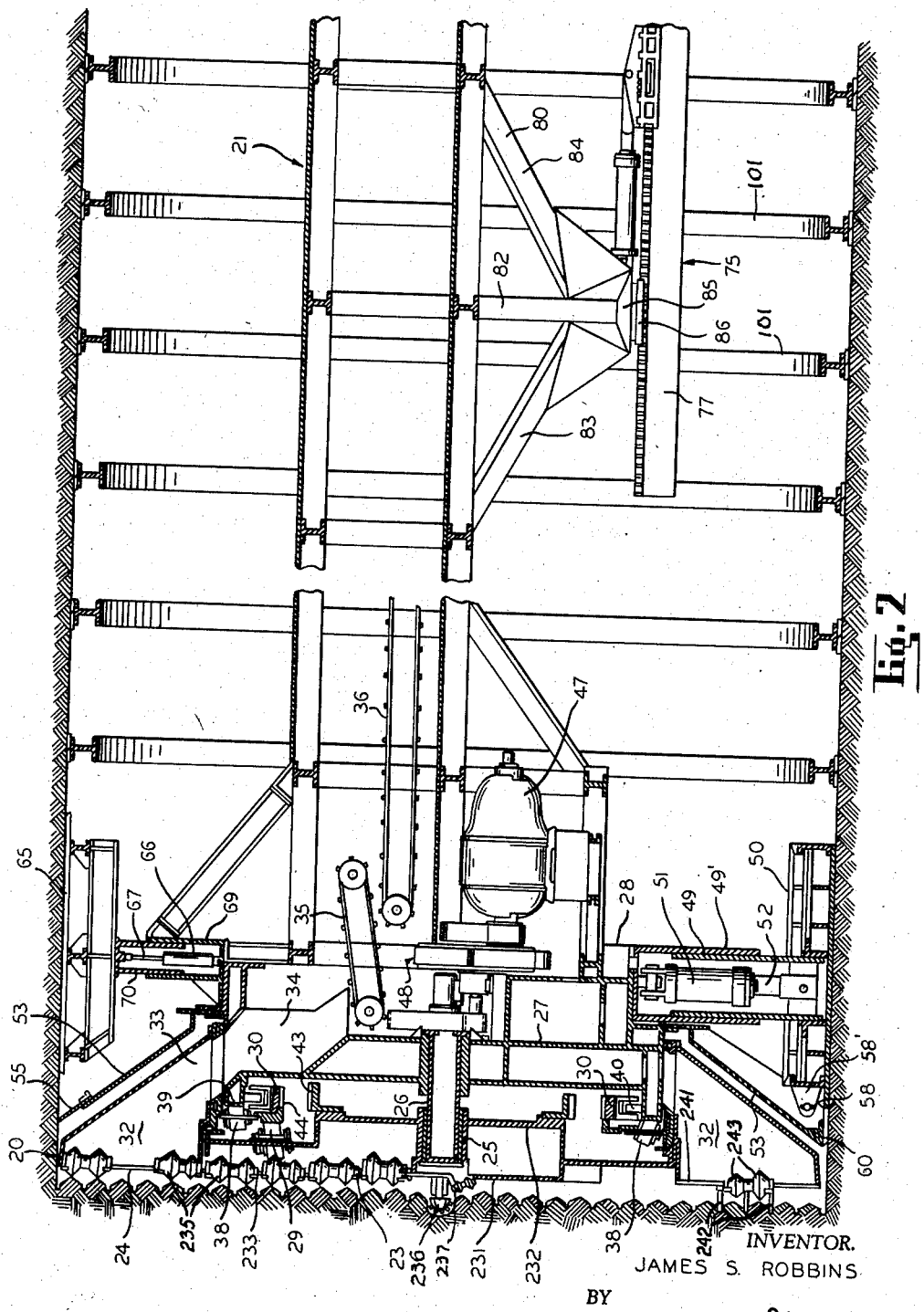

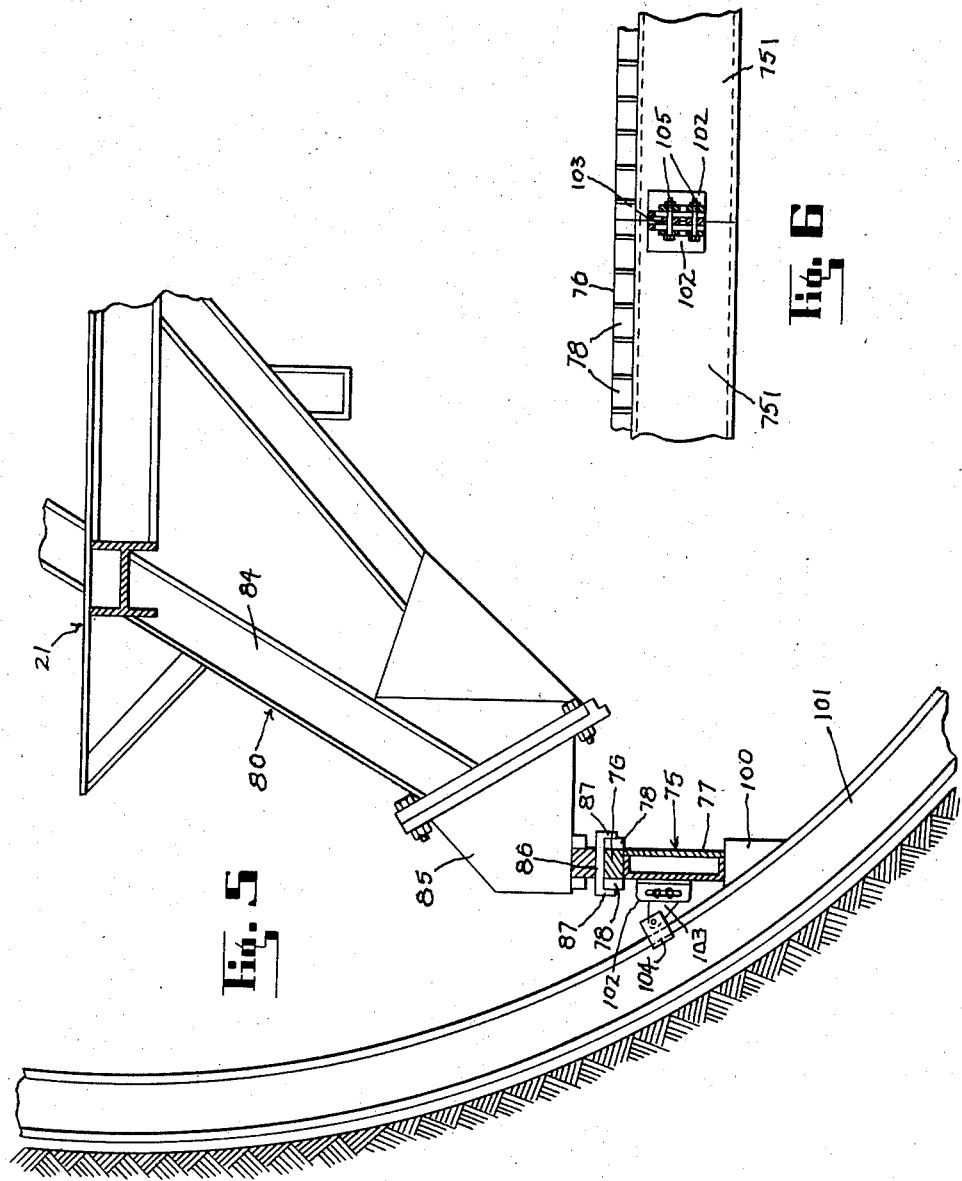

United States Patent Office 2,898,742
Patented Aug. 11, 1959

2,898,742

ROTARY TUNNELING MACHINE HAVING RATCHETING ADVANCING AND RETRACTING MEANS

James S. Robbins, St. Paul, Minn., assignor to Goodman Manufacturing Company, Chicago, Ill., a corporation of Illinois Application March 8, 1957, Serial No. 644,828

5 Claims. (Cl. 61—84)

This invention relates to improvements in tunneling machines of the rotary cutter head type, such as a machine of the kind disclosed in my Patent No. 2,766,978, issued October 16, 1955, which is especially adapted for cutting large bores in relatively solid minerals, and in which special problems of structural design are encountered because of the magnitude of the machine.

One of the principal objects of the invention is to provide a simpler and more efficient machine of the character described.

A further object of the invention is to provide improved means for supporting the cutter head for advancing it forwardly for the boring operation and retracting it from the working face when desired.

Other objects and advantages of the invention will appear from time to time as the following description proceeds.

The invention may best be understood by reference to the accompanying drawings, in which:

Figure 1 is a fragmentary plan view showing the front end of a machine constructed in accordance with the invention, with certain parts broken away and others shown in section;

Figure 2 is a fragmentary side view of the machine shown in Figure 1, with certain parts broken away and others shown in section;

Figure 3 is an enlarged detail view of a portion of the advancing and retracting mechanism;

Figure 4 is a side view of the parts of the advancing and retracting mechanism shown in Figure 3;

Figure 5 is a fragmentary detail section taken generally on line 5—5 of Figure 1; and Figure 6 is a detail side view of a portion of the sectioned rail forming part of the advancing and retracting mechanism.

Referring now to details of the embodiment of the invention shown in the drawings, the machine has a cutter head at its forward end indicated generally at 20, supported on a rearwardly extending main frame or jumbo 21. The cutter head includes a circular inner cutter member 23 surrounded by an outer cutter member 24, which cutter members are arranged for rotation in opposite directions to neutralize the torque reaction on the jumbo.

The inner cutter member consists essentially of a double walled disc having front and back circular walls 231 and 232. Inset in the front wall and protruding therefrom, are a plurality of radially extending cutter arms 233, each carrying a radial alignment of kerf cutting bits (not shown), and core breaking rollers 235 of the kind disclosed in my U.S. Patent No. 2,766,977. At the center of the front wall is a pilot cutter 236 and other core breaking rollers 237. Details of the kerf cutting bits and core breaker rollers need not be further described.

The front wall 231 and the rear wall 232 of the inner cutter member 23 are both fixed to a center bearing 25 journaled on a stub shaft 26 projecting forwardly from a member 27 which forms part of a frame member 28 fixed to the jumbo 21 for supporting the entire cutter head.

The outer cutter member 24 consists essentially of bearing and drive ring 30 disposed rearwardly of the outer periphery of the inner cutter member 23 and having a plurality of radially extending cutter arms 241, herein six in number, projecting therefrom in forwardly offset relation so that their front faces are in substantially the same vertical plane as the front faces of the cutter arms 233 on the inner cutter member. These cutter arms 241 have a plurality of cutter bits 242 and core breaking rollers 243 therealong, similar to the bits previously described and core breaking rollers on the inner cutter member, excepting that they are disposed for cutting in the opposite direction as the inner and outer cutter members 23 and 24 are rotated in opposite directions.

Each of the outer cutter arms 241 carries a material gathering bucket 32 on its rear face. The leading sides of said buckets are open to enable them to scoop up the loose material which drops to the floor of the tunnel as it is removed from the working face. As each bucket is rotated to the top of the cutter head, the loose material is discharged rearwardly therefrom by gravity through a bucket outlet 33, thence through a registering chute 34 in the main frame and deposited on the front end of a belt conveyor 35, from which it is loaded upon a conveyor 36 extending longitudinally along the jumbo 21 for final discharge, as usual, through a system of extensible conveyors (not shown) adjacent the rear end of the latter.

As shown in Figures 1 and 2, the thrust on the outer cutter member 24 is transmitted to the main frame 28 by a plurality of rollers 38 spaced circumferentially on the drive ring 30 and having rolling engagement with the front face of a bearing ring 39 forming part of the main frame 28 connected to said jumbo. A plurality of rollers 40 on brackets 41 are also mounted on the drive ring 30, in rolling engagement with the inner face of the bearing ring 39 (see Figure 1).

The thrust on the inner cutter member 23 is partially transmitted indirectly to the main frame by a series of rollers 29 mounted circumferentially around the inner wall 232 of said inner cutter member, and in rolling engagement with the drive ring 30 of the outer cutter member 24 (see Figure 2).

The inner cutter member 23 has an external ring gear 43 fixed concentrically on its rear wall 232, and the drive ring 30 of the outer cutter member 24 has an opposed internal gear 44 of larger diameter. The two gears 43 and 44 are driven in opposite directions by pinions 45, 45 on shafts 46, 46 which are connected to a drive motor 47 through suitable drive gearing indicated generally at 48, one pinion 45 and shaft 46 being shown herein, the other pinion and shaft being diametrically opposed to the pinion and shaft shown.

The main frame 28 and cutter head 20 are supported on the tunnel floor by a sliding shoe 50 on which the height of the cutter head and the front end of the jumbo are vertically adjustable by a hydraulic cylinder 51 pivotally connected at its upper end to the main frame 28 and with its piston 52 pivotally connected at its lower end to said sliding shoe. The cylinder 51 and piston 52 are enclosed in telescopic cylindrical guide members 49 and 49' connected respectively to the main frame 28 and the sliding shoe 50 (see Figure 1).

An arcuate shield generally designated at 53 is carried on the main frame 28 just behind the cutting head and functions to crowd dislodged material forward into the path of the pick-up buckets 32 on the outer cutter member 24. As seen in Figure 2, said shield is forwardly and outwardly inclined to correspond with the inwardly and rearwardly inclined rear walls of the buckets 32. The shield may be fabricated from a plurality of sheet metal segments. The shield structure so far described is generally similar to that disclosed in my prior Patent No. 2,766,978.

The main frame 28 and cutter head 20 also have laterally extending shoes 59 adapted for engagement with the side walls of the tunnel to hold the machine in centered relation in the bore, or for shifting the head toward one side or the other. As seen in Figure 1, these shoes 59 are each mounted for telescopic horizontal adjustment relative to the main frame 28 by means of a cylindrical member 61 extending radially from a base 61' fixed to the main frame and a cooperating cylindrical member 62 fixed to the shoe 59, and telescopically movable in the cylindrical member 61. Horizontal adjustment of each of the shoes 59 is afforded by a hydraulic cylinder 63 connected at its inner end to the cylindrical member 61, and with its piston 64 connected at its outer end to the base of the shoe 59. The two hydraulic cylinders may be extended together to engage the side walls, and may also be actuated independently of each other, to change the direction of advance of the head toward one side or the other, as may sometimes be desirable.

A plurality of retractable roof supporting plates 65 are mounted on the main frame 28, as shown in Figure 2. In the form shown, three of such roof plates are employed, each being arcuate to conform generally with the bore of the tunnel and arranged circumferentially of each other. Each of these roof plates is arranged for radial adjustment by a hydraulic cylinder 66 connected at its inner end to the main frame 28 and with its piston 67 connected at its outer end to a bracket 68 secured to the underface of its respective roof supporting plate. In the form shown, each hydraulic cylinder 66 and piston 67 is enclosed by cylindrical telescope members 69 and 70 which form guides for radial extension and retraction of the roof plates.

The means for advancing and retracting the main frame and cutter head relative to the working face consists essentially of a pair of supporting rails 75, 75 adapted to be detachably secured to the tunnel walls at opposite sides and below the jumbo 21 (see Figures 1 and 2), to provide both sliding support for the jumbo, and a ratcheting device 79 for bodily advancing or retracting the jumbo and the cutter head.

In the form of advancing and retracting mechanism shown herein, each supporting rail 75 consists of a T-shaped beam including a horizontally widened upper guide plate 76 fixed on a vertically elongated member 77. The guide plate 76 has a plurality of notches 78, 78 formed along its opposite sides for engagement by the ratcheting device 79.

Supporting brackets 80, 80 are fixed at each side of the jumbo 21 and extending outwardly and downwardly therefrom. These brackets are made up of framework of substantial rigidity, in the form shown including laterally extending frame member 81 and 82 and other forwardly and rearwardly inclined frame members 83 and 84 connected to a supporting member 85. A shoe 86 is mounted on the underside of the supporting member 85, for sliding engagement on the top of the adjacent guide plate 76. Said shoe also has depending side flanges 87 adapted to embrace the opposite sides of the guide plate 76.

The ratcheting device, indicated generally at 79, is also slidably mounted on the notched guide plate 76 and is connected to the supporting member 85 by a horizontally disposed hydraulic cylinder 91 and piston 92. As shown in Figures 3 and 4, said ratcheting mechanism 79 consists of an elongated shoe 93 adapted to ride on the notched guide plate 76, and having depending side portions 94 on which are mounted a pair of rocking dogs or pawls 95, 95 pivoted on upright pins 96. These dogs or pawls are each adapted to be biased by springs 97 which, when arranged as shown in full lines in Figures 5 and 6, will urge one end 98 of each dog inwardly toward the adjacent side of the notched guide rail 76, so that said dogs will have a ratcheting action to advance the machine as a whole toward the working face as the piston 92 is reciprocated under hydraulic power.

The springs 97 may also be shifted by hand to the position shown in dotted lines in Figures 3 and 4, whereupon the opposite ends 99 of the dogs 95 will then be biased inwardly to produce a ratcheting action of the mechanism 79 in the opposite direction when the piston 92 is reciprocated, thus causing retractive movement of the entire machine relative to the working face.

The rails 75 which carry the guide plates 76 may be anchored to the tunnel walls in any suitable manner. In the form shown herein, each rail 75 may be mounted along a plurality of standards 100, suitably fixed to the ring beams 101 of the type commonly employed for supporting the walls of a tunnel. The rails 75 are also anchored against longitudinal movement by a plurality of brackets 102 secured to the outer face of the rail 75 and having outwardly projecting wings 103 connected to clamps 104 secured to the inner flange of an adjacent ring beam 101.

Figure 6 illustrates the manner in which each supporting rail 75 can be made up of a plurality of sections 751 secured together in end to end relation by means of a pair of similar brackets 102, 102 secured in opposed relation at the abutting end of the rail sections 751, 751. The two opposed brackets 102 are secured together by through-bolts 105, 105 which also pass through a wing 103. With this type of sectional rail structure a separate section 751 may be detached from the rear end of the rail structure when the ratcheting mechanism 79 passes forwardly beyond said section. Said section can then be reattached to the front end of the rail structure in anchored relation to the supporting rings. Accordingly, it is possible to continue the advance or retraction of the machine by a whole, by utilizing only detachable rail sections of relatively short length, rather than utilizing much longer lengths of rail.

Although I have shown and described a certain embodiment of my invention, it will be understood that various changes and modifications may be made without departing from the spirit and scope of the invention as defined by the appended claims.

I claim:

1. In a tunneling machine, a main frame having a rotary boring head journalled thereon, and having means mounted thereon for driving said boring head, an elongated jumbo connected at its front end to said main frame and projecting rearwardly of the latter, a sliding shoe for slidably supporting said main frame on a tunnel floor, means for supporting a rearward portion of said jumbo on the tunnel floor and for advancing and retractably moving said main frame and rotary boring head with respect to the working place including a pair of parallel spaced elongated rails supported on the tunnel wall in laterally spaced relation with respect to said jumbo, supporting members extending angularly outwardly and downwardly from said jumbo and having sliding shoes mounted on the lower ends thereof, each being slidably supported on one of said rails and retained from lateral movement with respect thereto, a separate ratchet device slidably supported on each of said rails for extensible and retractable movement therealong and having slidable engagement with opposite sides of said rails for retaining said ratcheting devices from lateral movement with respect thereto, and hydraulic cylinder and piston devices connected between said support members and said ratcheting devices for extensibly and retractably moving said jumbo along said rails and extensibly and retractably moving said boring head with respect to the working place.

2. A tunneling machine in accordance with claim 1 wherein said rails have ratchet teeth extending along opposite sides thereof and wherein said ratchet devices comprise shoes slidably mounted on said rails having side portions extending downwardly along each side thereof having ratchet dogs mounted thereon for movement about parallel vertical axes and biased into engagement with said ratchet teeth.

3. A tunneling machine in accordance with claim 2 wherein the ratchet dogs are mounted on said side portions intermediate the ends of said ratchet dogs, wherein spring means are provided to bias said ratchet dogs into engagement with said ratchet teeth, and wherein said spring means are positionable to bias either of the ends of said ratchet dogs into engagement with said ratchet teeth to effect extensible or retractable movement of said boring head with respect to the working place.

4. A tunneling machine in accordance with claim 1 wherein the rails comprise a plurality of rail sections in end-to-end abutting relation with respect to each other and wherein attaching means free from the ratcheting devices are provided for detachably connecting said rails together in end-to-end relation.

5. A tunneling machine in accordance with claim 1 wherein spaced ring beams extend within the tunnel wall, wherein support standards for said rails are mounted on said ring beams above the tunnel floor, and wherein detachable anchoring brackets anchor said rails to said ring beams and take the lateral thrust on said ring beams and anchor said rails from longitudinal movement with respect to the tunnel wall.

References Cited in the file of this patent

UNITED STATES PATENTS

| | | |
|---|---|---|
| 1,932,068 | Englebright et al. | Oct. 24, 1933 |
| 2,588,068 | Williams et al. | Mar. 4, 1952 |
| 2,756,034 | Calder | July 24, 1956 |
| 2,756,036 | McIntyre | July 24, 1956 |
| 2,766,028 | Plant | Oct. 9, 1956 |
| 2,798,707 | Kandle | July 9, 1957 |

OTHER REFERENCES

"Western Construction," February 1955, pages 15–17.